United States Patent [19]

Guth

[11] 4,446,570

[45] May 1, 1984

[54] COLLIMATOR FOR A RADIATION DETECTOR AND METHOD OF MAKING SAME

[75] Inventor: William R. Guth, Hoffman Estates, Ill.

[73] Assignee: Siemens Gammasonics, Inc., Des Plaines, Ill.

[21] Appl. No.: 284,226

[22] Filed: Jul. 17, 1981

[51] Int. Cl.³ ............................................. G03B 41/16
[52] U.S. Cl. .................................... 378/149; 250/505.1
[58] Field of Search ............................... 378/149, 150; 250/505.1

[56] References Cited

U.S. PATENT DOCUMENTS

| | | | |
|---|---|---|---|
| 2,659,017 | 11/1953 | Bartow | 378/149 |
| 2,871,367 | 1/1959 | Gournay | 378/150 |
| 3,011,057 | 11/1961 | Anger. | |
| 3,921,000 | 11/1975 | Muehllehner. | |
| 3,943,366 | 3/1976 | Platz. | |
| 4,181,839 | 1/1980 | Hatton. | |

Primary Examiner—Craig E. Church
Attorney, Agent, or Firm—Karl F. Milde, Jr.

[57] ABSTRACT

A collimator for an Anger-type scintillation camera is disclosed in which a plurality of spaced pins of radiation transmitting material located within an internal cavity of a collimator housing serve as radiation transmitting channels and mercury filling the spaces between the pins serves as the radiation opaque septa. A channel containing mercury formed between the outermost pins and the side of the cavity serves as a mask to define the field of view of the camera crystal. A thermal expansion recess above the masking channel accommodates volume changes in the mercury due to changes in temperature. A method is disclosed for making the collimator housing out of molded plastic. Pins formed integrally with a base member and pins formed integrally with a cover plate are mated together to give high collimator aperture density. Filling ports are used to introduce mercury at elevated temperature into the closed structure.

9 Claims, 6 Drawing Figures

COLLIMATOR FOR A RADIATION DETECTOR AND METHOD OF MAKING SAME

BACKGROUND OF THE INVENTION

1. Field of the Invention

This invention relates to a collimator for a radiation detector, such as an X-ray camera or a nuclear radiation detecting scintillation camera used for imaging distributions of radioactive material in organs of the human body.

2. Description of the Prior Art

Radiation detectors, such as nuclear radiation detectors like scintillation cameras, are widely used to develop information for medical diagnostic purposes based on signals derived from a source of radiation. A well-known radiation detector of a type to which the present invention finds application is the Anger-type scintillation camera, the basic principles of which are explained in U.S. Pat. No. 3,011,057. The Anger camera is used to determine the distribution of a radiation emitting substance in a human body organ by analyzing the locations of scintillation events which occur on a crystal due to rays incident from the body organ. The Anger camera and other radiation detectors typically employ a radiation collimator between the radiation sensitive transducer (e.g. the crystal in the Anger camera) and the source or radiation.

The purpose of using a radiation collimator is to provide radiation transmissive passageways to ensure a mapping correspondence between respective elemental volumes of the radiation source (e.g. the body organ) and elemental volumes of the transducer (e.g. the Anger camera crystal). The most commonly used collimator is a multi-channel collimator comprising a number of collimating apertures separated from each other by walls or septa of a solid radiation opaque materal—most commonly lead.

It is well known that radiation collimator design involves basically the parameters of aperture size and shape, septal thickness, and aperture length. These are the parameters which determine the resolution and efficiency of the collimator for radiation (e.g. gamma rays) of a particular energy. In general, the septal thickness, which is the thickness of the walls separating adjacent collimating apertures, is chosen in accordance with the energies of the rays to be collimated so that the collimator will block the rays which enter the collimator at an angle and location such that they would otherwise traverse the wall between two apertures. Thus the septal thickness must be relatively large for collimators used with high energy radiation sources, but for low energy sources the septum or wall between the apertures may be quite thin. Indeed, it is desirable to employ only the septal thickness actually required for the radiation energy involved in order to avoid unnecessary loss of efficiency.

Many multi-channel collimators are made of cast lead. Pins of desired cross-sectional shape are placed into pilots or recesses of a casting basin to form a nest. Molten lead is then poured into the basin to flow into the spaces between adjacent pins and between the pin nest and the basin wall. After the lead is allowed to cool somewhat, the casting is removed from the basin and the pins are manually beaten or pulled out of the casting one at a time. The holes left in the casting by the removal of the pins form the collimator apertures. The hardened lead occupying the spaces left between the pins forms the collimator septa. A collimator formed by the casting process can have relatively evenly spaced and uniform apertures. However, the manual loading of pins into the casting basin and the manual removal of the pins from the cooled casting is both tedious and time-consuming. And, although the lead is cool relative to its temperature when molten at the time of pin removal, even though protective clothing is worn, there may still be a risk of burns when the pins are removed.

Other collimators are formed without the necessity of the described tedious pin setting and removal process by a cold extrusion and gluing method. Such collimators are built up from layers or "slices" of cold-shaped lead which are glued side-by-side into a sandwich collimator structure. U.S. Pat. Nos. 3,921,000 and 3,943,366 disclose examples of structures having strips of corrugated lead foil fastened together in rows to build up a collimator structure of the desired size. The manufacture of collimators using cold-extruded slices, like the corrugated strips disclosed in U.S. Pat. Nos. 3,921,000 and 3,943,366, however, presents severe tolerance problems. The corrugations must be extremely uniform from strip to strip or they will not match up at the surfaces which are to be mated and fastened together throughout the length of each strip. Furthermore, the use of lead as the corrugated material creates additional problems due to its very low tensile strength. The manufacture of collimators by this build-up process is especially troublesome in the manufacture of "diverging," "converging" and "multi-view" collimators.

The terms "diverging" and "converging" are defined viewing the collimator from the transducer side. A "diverging" collimator is one having channels focused at a point some distance away and arranged to diverge in the transducer, so that objects smaller than the transducer can be imaged in a magnified way. A "converging" collimator is one having channels arranged to converge in the transducer, so that objects larger than the transducer can be imaged. A "multi-view" collimator, such as disclosed in U.S. Pat. No. 4,181,839, includes sets of channels oriented so that a plurality of simultaneous views of the same object of diagnosis can be obtained.

SUMMARY OF THE INVENTION

It is an object of this invention to provide an improved collimator for use with a radiation detector, such as a scintillation camera.

It is another object of this invention to provide an improved method of manufacturing a collimator which avoids the problems associated with prior art collimator manufacturing techniques.

In accordance with one aspect of the invention, a collimator is provided in which a radiation opaque material in fluid form, such as mercury, is utilized instead of a solid radiation opaque material such as lead. The collimator comprises a housing having an internal cavity bounded by upper, lower and side internal surfaces. A plurality of spaced pins of radiation transmitting material are located within the cavity and join the upper and lower surfaces to form the collimator apertures or radiation transmitting channels. The spaces between adjacent pins and between the pins and the side surface are filled with a normally fluid radiation opaque material, such as mercury.

In a preferred embodiment, the housing has the shape of a hollow disc, the inside cavity being described by upper and lower circular internal surfaces and a cylindrical sleeve-like side internal surface joining them. The pins advantageously comprise columns of uniform hexagonal cross section, whose ends are either flush or integral with the upper and lower internal surfaces of the housing. The pins are closely nested within a circular pattern in the center of the cavity so that the perimeter of the nest is uniformly spaced from the side internal surface. The spaces between adjacent pins and between the pins and the side surface form communicating passages, and the adjacent walls of the respective pins are evenly spaced throughout the nest. Mercury fills these communicating passages, so that the filled spaces form the septa of the collimator and so that the filled toroidal chamber between the perimeter of the pin nest and the side internal surface of the housing cavity serves as a mask to outline the useful field of view of the transducer. The upper internal surface of the housing at the periphery of the nest of pins is recessed so that the housing cavity includes a toroidal ring raised above the tops of the pins, thereby providing a thermal expansion chamber for mercury expansion.

In another aspect of the invention, a method of manufacturing a collimator is disclosed in which a closed body member is formed with an internal cavity in which is located a plurality of pins of radiation transmitting material as described above and also a sealable filling port connecting the internal cavity with the outside of the body member. A sufficient quantity of normally fluid radiation opaque material, such as mercury, is then introduced into the cavity through the filling port to fill the spaces between adjacent pins and between the pins and the side internal surface, and the filling port is sealed. In a preferred method of manufacture, the closed body member is formed by securing together a base member and a cover plate which are respectively molded to define the lower and upper internal cavity surfaces. The pins are advantageously formed integrally with either one or both of the base member and cover plate so as to be brought into positions in a central nest within the internal cavity established when the member and plate are brought together.

There have thus been outlined rather broadly certain objects, features and advantages of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including such equivalent arrangements as do not depart from the spirit and scope of the invention.

BRIEF DESCRIPTION OF THE DRAWINGS

An embodiment of the invention has been chosen for purposes of illustration and description, and is shown in the accompanying drawings forming a part of the specification, wherein.

Throughout the drawings, like elements are referred to by like numerals.

DETAILED DESCRIPTION OF THE PREFERRED EMBODIMENT

Figure 1:
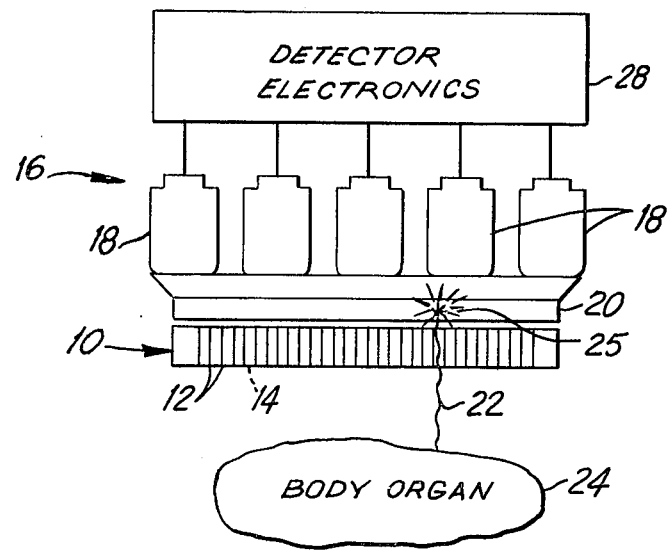
FIG. 1 is a schematic view of an Anger-type scintillation camera.

An example of a collimator 10 formed in accordance with the principles of the present invention has septa 12 and apertures 14 and is usable with a ray diagnosing device, such as an Anger-type scintillation camera 16 shown schematically in FIG. 1. The Anger-type camera 16 has a scintillation detector head that employs an array of photomultiplier tubes 18, respectively viewing overlapping portions of a disc-shaped scintillation crystal transducer 20 which is typically formed of thallium-activated sodium iodide. A gamma ray 22 emitted from a source of radiation, such as a human body organ 24 which has assimilated therein a radioactive substance, is channeled through the apertures 14 of the collimator 10 and impinges upon the crystal 20. When the ray 22 strikes the crystal 20, a flash of light 25 occurs which is called a "scintillation event." The light emitted from the event 25 travels through a light pipe 26 and is detected by those of the photomultiplier tubes 18 which view the area of emission. These photomultiplier tubes 18 generate electrical signals proportional to the intensity of the detected light upon the occurrence of the event 25. The respective signals are then transmitted to detector electronics 28, where they are matrixed together to provide positional information which identifies the location on the plane of crystal 10 of the scintillation event 25. The collimator 10, interposed between the transducer 20 and the source of radiation 24, channels the ray 22 so that there is a correspondence between the location on the crystal 20 of the event 25 and the point of origin on the body organ 24 of the incident ray 22 which caused the event 25. The locations in the plane of crystal 20 of successive events 25 corresponding to successive rays 22 are mapped to give an image for medical diagnosis of the distribution of the radioactive substance in the body organ 24.

Figure 2:
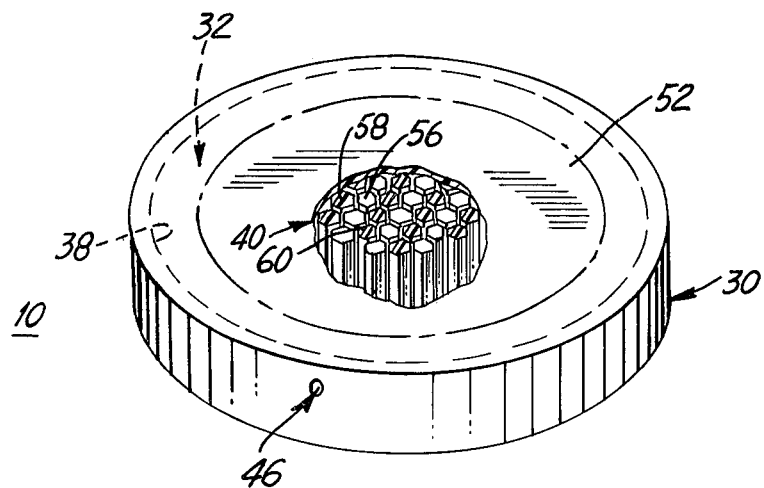
FIG. 2 is a perspective view, including a enlarged cutaway section, of a collimator in accordance with an embodiment of the present invention.
Figure 3:
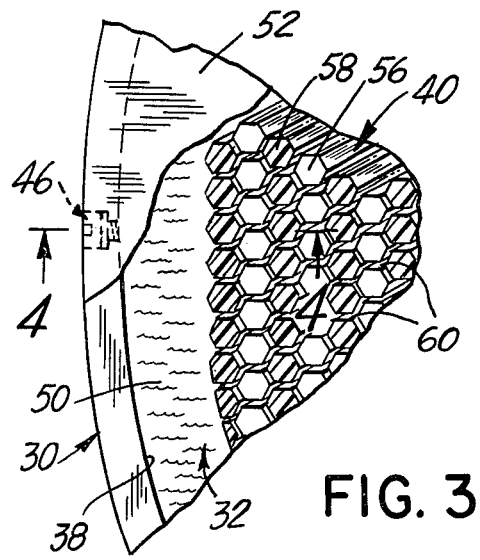
FIG. 3 is an enlarged perspective view, partially cut away, of a portion of the collimator of FIG. 2.
Figure 4:
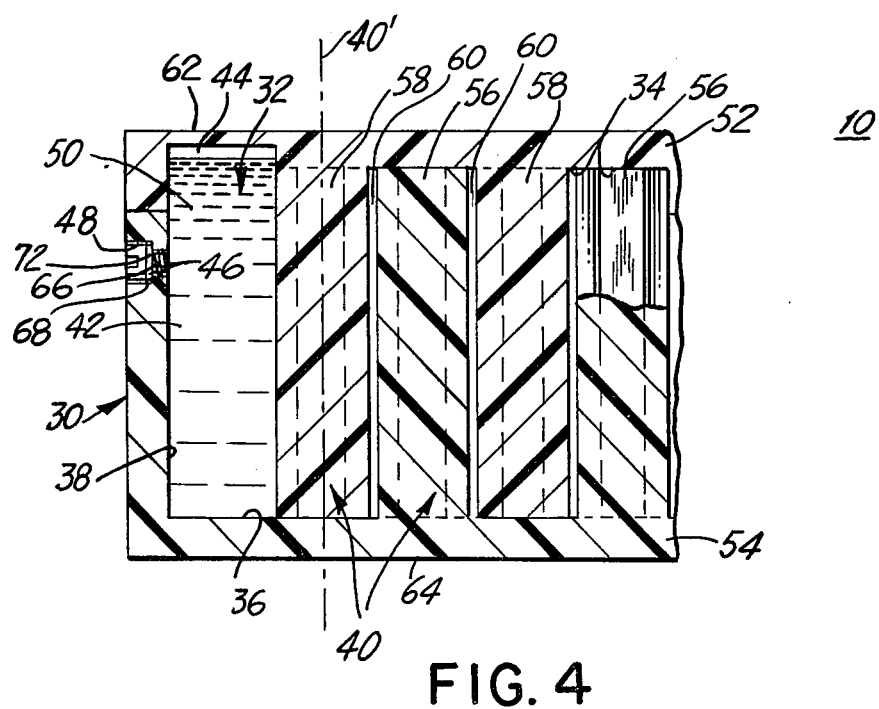
FIG. 4 is a section view taken along the line 4—4 of FIG. 3.

As shown in FIGS. 2-4, the collimator 10 comprises a housing 30 having an internal cavity 32 bounded by upper, lower and side internal surfaces 34, 36 and 38 (see FIG. 4). Located within the internal cavity 32 of the housing 30 is a plurality of spaced pins 40 joining the upper and lower surfaces 34 and 36. The housing 30 is disc-shaped and the upper and lower cavity surfaces 34 and 36 are parallel horizontal circular surfaces coaxial with the disc-shape of the housing 30. The pins 40 are vertical cylindrical columns of hexagonal cross-section nested within a circular array in the center of and coaxial with the internal cavity 32 of the housing 30. The periphery of the nest of pins 40 is uniformly spaced from the side surface 38 of the cavity 32 so as to leave a toroidal-shaped channel portion 42 between the outside pins 40 and the side internal surface 38. The upper internal surface 34 of the cavity 32 includes a toroidal recessed portion 44 which extends coextensively with the top of the toroidal-shaped channel portion 42. Two filling ports 46 are located at diagonally opposite points of the side surface 38 adjacent the top of the channel portion 42 of the housing 30. The filling ports 46 are sealed with a removable screw 48 and serve to connect the internal cavity 32 with the outside of the housing 30.

A normally fluid radiation opaque material 50, preferably mercury, fills the spaces of the cavity 32 between adjacent pins 40 and between the pins 40 and the side surface 38 (i.e. the channel portion 42).

As shown in FIG. 4, the collimator housing 30 is a closed body member comprising a cover plate 52 secured to a base member 54. The cover plate 52 and base member 54 are respectively made of a radiation transmitting material, such as glass or plastic, with plastic being preferred because it can be easily molded. The base member 54 is formed to include integrally therewith a first plurality 56 of the pins 40 and a large part of the side surface 38. The cover plate 52 is similarly formed to include integrally therewith a second plurality 58 of the pins 40, the toroidal recess 44, and a smaller part of the side surface 38. The dimensions of the cover plate 52 and base member 54 are chosen so that when they are mated together, such as by gluing, the tops of the pins 56 (see FIG. 4) come into sealing contact with the upper surface 34 and the bottoms of the pins 58 come into sealing contact with the lower surface 36. Likewise, the portions of the side surface 38 formed integrally with the cover plate 52 and base member 54, respectively, should also come into sealing contact with each other. The pins 40 serve as the radiation transmitting channels or apertures 14 of the collimator structure 10. The spaces 60 between the adjacent pins 40 which are filled with mercury function as the walls or septa 12 of the collimator 10. As shown in the drawings, the pins 40 are positioned with their axes 40' (see FIG. 4) parallel to each other and perpendicular to the planes of the top and bottom outside surfaces 62 and 64 of the housing 30. This configuration provides a vertical multichannel parallel collimator. The pins 40 can alternatively be arranged to provide a parallel slant hole collimator by orienting their axes 40' to be parallel to each other, but at an angle with respect to the planes of the top and bottom outside surfaces 62 and 64. Moreover, the pins 40 can be positioned in unparallel arrays with their axes arranged in the fashion of a converging, diverging or multi-view collimator. The mercury-filled toroidal channel portion 42 of the collimator 10 serves as a mask for outlining the useful field of view of the crystal 20 of the radiation detector 16. The toroidal recess 44 which forms a raised ring around the periphery of the upper internal surface 34 functions as an expansion chamber to accommodate changes in volume of the mercury 50 due to changes in temperature.

In manufacture, the cover plate 52 and the base member 54 are preferably formed of molded plastic. As described above, the pins 56 and 58 are formed integrally with the base member 54 and the cover plate 52, respectively, in the molding process. The base member 54 is formed with two filling ports 46 located at diagonally opposite points near the top of the side internal surface 38 portion of the base member 54. Each filling port 46 (see FIG. 4) comprises an internally threaded bore 66 and a countersink bore 68 of slightly larger diameter than bore 66. A threaded screw 48 having a compressible pad washer 72 is selected to be screwed into the bore 66, so that the head of the screw 48 is received into the countersink bore 68 to be flush with or below the external side surface of the collimator 10 with the washer 72 compressed to seal the opening of the filling port 46 after the mercury 50 is introduced into the cavity 32. The screw 48 can be removed to unseal the port 46 when it is desired to empty the mercury 50 out of the collimator 10. Locating the filling ports 46 so that the bore 66 opens onto the side internal surface 38 of the internal cavity 32 has the benefit that the curvature of the surface 38 facilitates the flow of the mercury 50 out of the cavity 32 during emptying.

After the cover plate 52 and the base member 54 have been molded to the desired proportions, they are securely fastened together by conventional means, such as with an expoxy glue. The cover plate 52 and the base member 54 fit together so that the tops of the first plurality 56 of the pins 40 formed integrally with the base member 54 mate sealingly with the upper internal cavity surface 34 formed in the cover plate 52. Similarly, the bottoms of the second plurality 58 of the pins 40 formed integrally with the cover plate 52 are brought into sealing engagement with the lower internal cavity surface 36 of the base member 54. It is beneficial to have some of the pins 40 formed integrally with the cover plate 52 and some formed integrally with the base member 54, as described, because construction of the molds required for high pin densities is facilitated. A hexagonal cross-section is selected for the pins 40 because it permits closer packing and offers a symmetry that provides good collimator performance. However, other cross sections such as circular, square, triangular, and so forth, may also be suitable.

Figure 5:
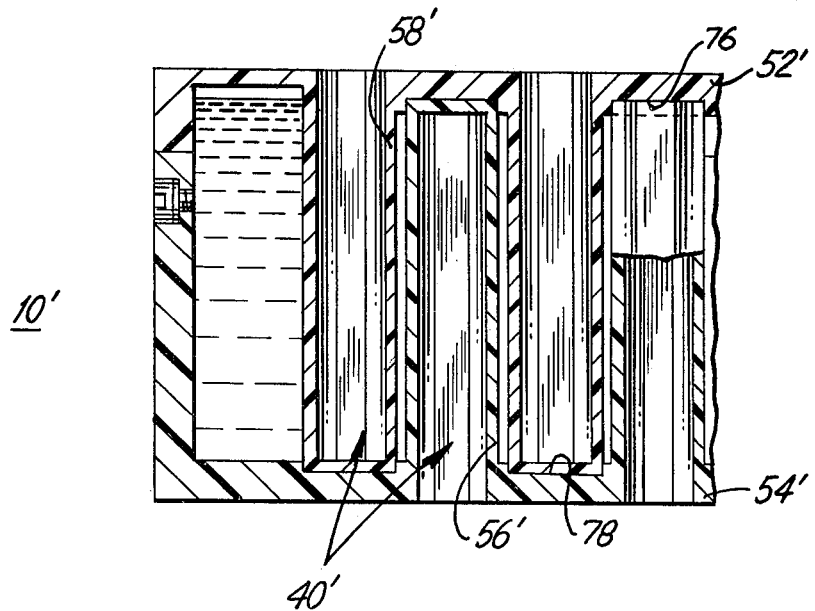
FIG. 5 is a view, corresponding to the view of FIG. 4, of a modified embodiment of a collimator formed in accordance with the present invention.

FIG. 5 shows an embodiment of a modified collimator 10' formed in accordance with the invention. The collimator 10' includes a molded plastic base member 54' and a molded plastic cover plate 52' integrally formed respectively with a first plurality 56' and a second plurality 58' of pins 40' which are substantially hollow. Such a construction provides radiation transmitting channels having greater radiation transmission characteristics than the channels of the pins 40 of the collimator 10 described above with reference to FIG. 4, the radiation transmission coefficient of air being less than that of plastic. Additionally, the cover plate 52' and the base member 54' of the modified collimator 10' shown in FIG. 5 are molded to have pilots or slots 76 and 78 for respectively receiving the ends of the first plurality 56' and the second plurality 58' of the pins 40' when the cover plate 52' and base member 54' are brought together. The pilots 76 and 78 facilitate alignment and provide the locations for applying the glue during assembly.

When the housing 30 in the form of the closed body member comprising the cover plate 52 fastened securely to the base member 54 has been prepared, a sufficient quantity of normally fluid radiation opaque material, preferably mercury, is introduced into the internal cavity 32 through one of the filling ports 46 to fill the spaces 60 between the adjacent pins 40 (i.e. the septa) and between the pins 40 and the side internal surface 38 (i.e. the toroidal channel 42). Though mercury is the preferred radiation opaque material, the use of other radiation attenuating materials which are fluid at the temperatures to which the collimator 10 will normally be subjected in use may also be suitable. Typical normal temperatures to which the collimator 10 may be subjected are room temperatures and can be expected to fluctuate between approximately 55° F. and 80° F. The collimator 10 must therefore be able to accommodate changes in the volume of the material 50 due to temperature variations. The toroidal recess 44 (see FIG. 4) formed to be above the level of the tops of the spaces 60 between the pins 40 serves as a thermal expansion chamber to accommodate such volume changes. The size of the raised recess 44 should be large enough so that the spaces 60 between the adjacent pins 40 remain filled for the temperatures encountered during actual use. In this way, the septa 12 formed by the filled spaces 60 between the adjacent pins 40 of the collimator 10 will have the same dimensions at the different operating temperatures so that performance will be uniform. The recess 44 must be sufficiently large so that at the highest temperature anticipated to be encountered during actual use, the volume of the material 50 will not expand (or the pressure build up) so that the collimator 10 leaks or, even worse, bursts open. Thus, it is recommended that the mercury 50 be introduced into the cavity 32 at an elevated temperature, which is above the highest temperature expected to be ever encountered in actual use.

In a preferred method of manufacture, mercury is introduced into the cavity 32 through one of the filling ports 46 at a temperature of 160°-180° F. to a level sufficient to just fill the spaces 60, the channel 42 and the recess 44. The screw 48 is then screwed into the filling port 46 to seal the collimator 10. The dimensions of the cavity are such that when the temperature of the mercury returns to room temperature, its level will be above the tops of the spaces 60 but below the top of the recess 44, thus, the recess 44 will accommodate normal temperature changes in the volume of the mercury 50 during collimator use without the mercury level dropping below the tops of the spaces 60.

Figure 6:
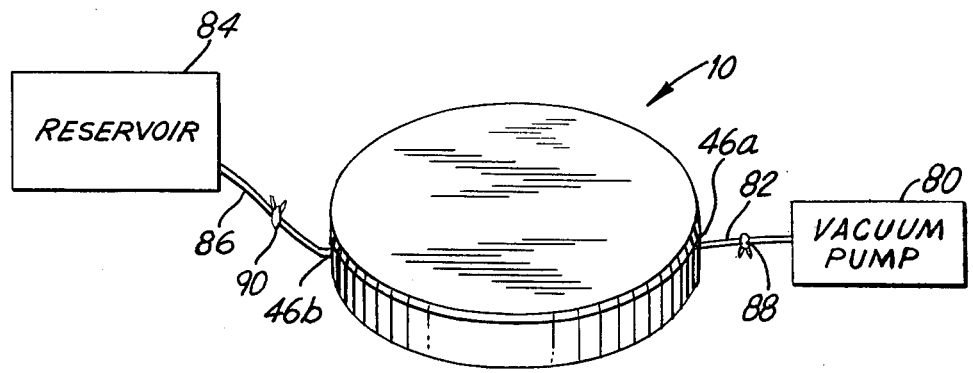
FIG. 6 is a schematic view showing the method of manufacture of the collimator of FIG. 2.

For a closely packed aperture configuration, the spaces 60 between adjacent pins 40 will be very small. In such a case, the introduction of the mercury 50 into the cavity 32 can be assisted by evacuating the cavity 32. This process is illustrated schematically in FIG. 6. A vacuum pump 80, or other evacuation means, is connected using a tube 82 to the open filling port 46a. A reservoir 84 of mercury 50 is connected by means of a second tube 86 to the diagonally opposite filling port 46b of the collimator 10. Clamps 88 and 90 provide valve means for the tubes 82 and 86, respectively. With clamp 90 closed so that no mercury supply reaches the collimator 10 and clamp 88 open, the vacuum pump 80 is engaged to evacuate the cavity 32 of the collimator 10. Thereafter, the clamp 88 is closed and the clamp 90 is opened to allow mercury 50 to flow from the reservoir 84 through the tube 86 and the filling port 46b into the cavity 32. When the mercury 50 has been introduced into the cavity 32 of the collimator 10 in a sufficient quantity to fill the spaces 60 between the pins 40, the toroidal-shaped channel portion 42 and the toroidal recess 44, the clamp 90 is closed. The collimator 10 is held in a position such that the filling port 46a is at the highest elevation. The tube 82 is then removed and the filling port 46a is sealed with a first screw 48, as previously described. The collimator 10 is then positioned so that the filling port 46b is at the highest elevation. The tube 86 is then removed and a second screw 48 is used to seal the filling port 46b. This operation is conducted with the mercury 50 at a temperature elevated above the highest expected operating temperature of the collimator 10. When the mercury 50 has cooled to its normal operating temperature, the recess 44 operates as a thermal expansion chamber to accommodate volumetric changes of the mercury 50 due to changing temperature.

A collimator as described above that comprises a plurality of spaced pins of radiation transmitting material located within the cavity of a closed housing to define the apertures and uses a radiation opaque material in fluid form to define the septa avoids the tedious pin-setting procedures of cast lead collimator manufacture and the tolerance problems associated with cold-extruded lead collimator manufacture. A collimator housing formed with a cavity containing radiation transmitting pins, as described above, can conveniently be manufactured out of molded plastic. A radiation opaque material in fluid form at normal operating temperatures, like mercury, can be readily introduced into the cavity to assume the shape of the passages left between the pins. Furthermore, since mercury has a radiation attenuation coefficient comparable to that of lead, a collimator as described above utilizing mercury as the radiation opaque material, offers these advantages over prior art collimators without degradation of radiation attenuating characteristics.

Having thus described the invention with particular reference to the preferred forms of collimator and a preferred method of manufacture, it will be obvious to those skilled in the art to which the invention pertains, after understanding the invention, that various changes and modifications may be made therein without departing from the spirit and scope of the invention as defined by the claims appended hereto.

What is claimed is:

1. A collimator having a plurality of septa and a plurality of apertures for channeling rays between a source of radiation and a transducer of a radiation detector after having positioned the collimator between the source of radiation and the radiation detector, comprising;
    (a) a collimator housing comprising
        (a1) a base member of radiation transmitting material having a lower and a side surface; and
        (a2) a cover plate of radiation transmitting material having an upper and a side surface;
    (b) a first plurality of spaced pins of radiation transmitting material formed integrally with the lower surface of the base member;
    (c) a second plurality of spaced pins of radiation transmitting material formed integrally with the upper surface of the cover plate; and
    (d) a normally fluid radiation opaque material;
    wherein the base member and the cover plates are mated together such that the first plurality of pins of the base member is in sealing contact with the upper surface of the cover plate and the second plurality of pins of the cover plate is in sealing contact with the lower surface of the base member, thus forming a collimator housing having an internal cavity bounded by upper, lower and side internal surfaces; and having a plurality of spaced pins of radiation transmitting material located within the cavity, formed integrally with the housing and joining the upper and lower surfaces to form the collimator apertures; and wherein the normally fluid radiation opaque material fills the spaces of the cavity between adjacent pins and between the pins and the side surface to form the collimator septa.

2. A collimator as defined in claim 1, wherein the pins are nested in the center of the cavity and the radiation opaque material filling the cavity space between the nest of pins and the side surface forms a mask for outlining the useful field of view of the transducer.

3. A collimator as defined in claim 1, wherein the upper internal surface of the housing cavity includes a recessed portion which accommodates changes in the volume of the fluid material due to change in temperature.

4. A collimator as defined in claim 1, wherein the housing further includes a sealable filling port connecting the internal cavity with the outside of the housing, whereby the fluid material can be introduced into the cavity.

5. A collimator as defined in claim 1, wherein the upper and lower internal surfaces are parallel, and the pins are uniformly sized pins which are nested in an evenly spaced array.

6. A collimator as defined in claim 5, wherein the pins are cylindrical pins of hexagonal cross section.

7. A collimator as defined in claim 1, wherein the housing is a disc-shaped housing; the upper and lower cavity surfaces are parallel circular surfaces coaxial with the disc-shape of the housing; the pins are cylindrical columns of hexagonal cross section nested in a circular array coaxial with the disc-shape of the housing and evenly spaced from the cavity side surface so as to leave a toroidal channel portion of the cavity between the periphery of the nest of pins and the side surface, the channel portion serving as a mask to define the useful field of view of the transducer; and the upper surface includes a raised toroidal recess portion coextensive with the channel portion, the recess portion serving to accomodate changes in volume of the fluid material due to changes in temperature.

8. A collimator as defined in claim 1, wherein the fluid material is mercury.

9. A collimator as defined in claim 1, wherein the centers of the pins are hollow.

* * * * *